United States Patent [19]

Hosoda et al.

[11] Patent Number: 4,609,589
[45] Date of Patent: Sep. 2, 1986

[54] RELEASE SHEET

[75] Inventors: Yukio Hosoda; Hiro Ohtsubo; Hiroyuki Yamada, all of Utsunomiya, Japan

[73] Assignee: Oji Paper Company, Ltd., Tokyo, Japan

[21] Appl. No.: 691,139

[22] Filed: Jan. 14, 1985

[30] Foreign Application Priority Data

| | | | |
|---|---|---|---|
| Jan. 18, 1984 | [JP] | Japan | 59-6726 |
| May 21, 1984 | [JP] | Japan | 59-102207 |
| Nov. 27, 1984 | [JP] | Japan | 59-250086 |
| Nov. 27, 1984 | [JP] | Japan | 59-250087 |
| Nov. 27, 1984 | [JP] | Japan | 59-250088 |
| Nov. 27, 1984 | [JP] | Japan | 59-250089 |
| Nov. 27, 1984 | [JP] | Japan | 59-250090 |

[51] Int. Cl.$^4$ .............................. C09J 7/02
[52] U.S. Cl. .................... 428/352; 428/416; 428/458; 428/460; 428/461; 428/463; 428/503; 428/514; 428/530
[58] Field of Search ............. 428/352, 416, 458, 460, 428/461, 463, 503, 514, 530, 353

[56] References Cited

U.S. PATENT DOCUMENTS

| | | | |
|---|---|---|---|
| 4,380,563 | 4/1983 | Ayotte | 428/352 |
| 4,398,985 | 8/1983 | Eagon | 428/352 |
| 4,424,244 | 1/1984 | Puskadi | 428/195 |
| 4,495,243 | 1/1985 | Kishi | 428/352 |

FOREIGN PATENT DOCUMENTS 59-48155 3/1984 Japan .

Primary Examiner—P. C. Ives
Attorney, Agent, or Firm—Cushman, Darby & Cushman

[57] ABSTRACT

A one-faced or double-faced release sheet presenting an adequate barrier against coating solutions of release agent, good adhesion to release agents, high heat resistance and minimum heat shrinkage comprising a support sheet having a release layer formed on at least one side thereof with an undercoated layer being disposed between said support sheet and the release layer, said undercoated layer being formed from a mixture of a soap-free type acrylic resin emulsion and oxidized starch.

17 Claims, 1 Drawing Figure

RELEASE SHEET

BACKGROUND OF THE INVENTION

The present invention relates to a release sheet having a release layer formed on at least one side of a single-layered or laminate support sheet with an undercoated layer inserted between the release layer and support Various types of release sheet are used with adhesive products such as adhesive tape and labels, as well as for producing synthetic leathers and shaped articles such as synthetic polyvinyl chloride leathers and carbon fiber prepregs. While release sheet used as an adhesive product should protect the adhesive surface of the product, it must be easily releasable from the sheet prior to use. Release sheet used in the production of synthetic leathers and shaped articles must also have good releasability, but in addition, the sheet must be heat-resistant and have a sheet strength sufficient to withstand handling in a specific process step. The basic construction of the release sheet used for these purposes consists of a support sheet having a release layer formed on at least one side thereof, with an undercoated layer interposed between the support and the release layer.

The support sheet is usually made of a cellulosic substrate such as paper, an inert polymeric film, a metal foil or a lamination thereof. Polymeric films having an inert surface have limited uses if they are not combined with other substrate materials since it is difficult to obtain a desired degree of releasability with the polymeric film alone. Furthermore, there are no undercoating agents that provide strong adhesion between polymeric films or metal foils and release agents. In order to provide better adhesion, attempts have been made to treat the surface of metal foils or polymeric films by corona treatment but no satisfactory results have been attained except with polyethylene films.

Release sheet is frequently subjected to various kinds of heat during processing or use, and the undercoating agent must be sufficiently heat-resistant to cause no change in the adhesion between the support sheet and the release agent.

Cellulose bases are able to possess a desired degree of releasability if a proper type of release agent is used, and a consistent releasability can be ensured by forming a uniform undercoated layer on the base surface. Among various cellulose bases, paper is extensively used. Most of the undercoated layers used today are formed by (1) a clay-base pigment, (2) a water-soluble polymer such as poly(vinyl alcohol) or (3) a polyethylene extrudate. However (1) has poor adhesion to the release agent, (2) shrinks greatly with heat, and (3) is not highly heat-resistant.

As shown above, conventional release sheet products have various defects, and none of the one-faced or double-faced release sheets available today have the properties required of various adhesive products or the enhanced processing necessary in the manufacture of synthetic leathers or shaped articles.

OBJECT OF THE INVENTION

The primary object of the present invention is to provide a one-faced or double-faced release sheet that presents an adequate barrier against coating solutions of release agent, has good adhesion to release agents, has high heat resistance and exhibits minimum heat shrinkage.

SUMMARY OF THE INVENTION

The present invention relates to release sheet that consists of a support sheet having a release layer formed on at least one side with an undercoated layer interposed between said support sheet and the release layer, said undercoated layer being made of a mixture of a soap-free type acrylic resin emulsion and oxidized starch. The present invention also relates to release sheet wherein said undercoated layer further contains a melamine-formaldehyde resin. The release sheet of the present invention is produced by the following method: a mixture of a soap-free type acrylic resin emulsion and oxidized starch or a mixture of such materials with a melamine-formaldehyde resin is coated onto either one or both sides of a support sheet; the resulting coat is dried; and a release layer is formed on the dried coat. The release sheet of the present invention thus prepared presents an adequate barrier against coating solutions of release agent, has good adhesion to the release agent, has high heat resistance to heat and exhibits minimum heat shrinkage.

The present invention also relates to a double-sided release sheet having a coating of release agent formed on both surfaces of a support made of a lamination of a cellulosic base sheet and a metal foil, with an undercoat principally made of a soap-free type acrylic resin emulsion being provided between the release coat and the cellulosic base sheet, and another undercoat which is principally made of a crosslining reaction product of thermosetting resins being provided between the release coat and the metal foil.

The undercoated layer on the cellulosic base sheet is made of a soap-free type acrylic resin emulsion alone, or a mixture of such emulsion and oxidized starch or a crosslinking reaction product of the emulsion and oxidized starch with a melamine-formaldehyde resin. The soap-free type acrylic resin emulsion or a mixture thereof with oxidized starch, either alone or in combination with the melamineformaldehyde resin, is applied to the surface of a cellulosic base support sheet, and after drying the resulting undercoated layer, a release layer is formed on that coat. By this treatment, the cellulosic base sheet is provided with a good barrier against coating solutions of release agent, good adhesion to the release agent, high heat resistance, and displays a minimal possibility of heat shrinkage.

A layer principally made of a crosslinking reaction product of thermosetting resins is formed on the metal foil side of the support sheet. Suitable combinations of the thermosetting resins are polyester resin/alkylated melamine, and epoxide/alkylated melamine or polyvinyl phenolic resin. A coating solution of a mixture of these compounds which are capable of crosslinking reaction is applied to the surface of a metal foil on the support sheet, and the resulting undercoat is dried and subsequently provided with a release layer. As a result, a double-sided release layer having high heat resistance and good adhesion to the release layer not only on the cellulosic base sheet side but also on the metal foil side is provided.

BRIEF DESCRIPTION OF THE DRAWINGS

In FIG. 1, the numeral 1 represents a paper base, 2 is a metal foil, 3 is an adhesive layer, 4 and 4' are undercoated layers, and 5 and 5' are coatings of release agent.

DETAILED DESCRIPTION OF THE INVENTION

Figure 1:
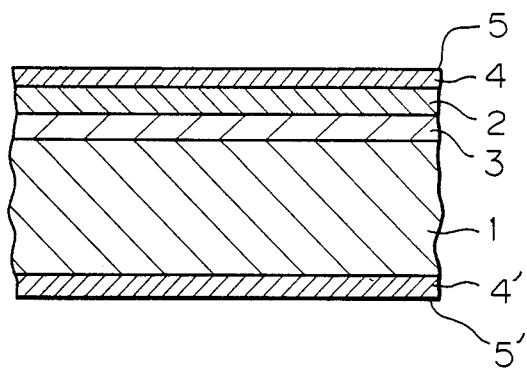
FIG. 1 is a cross section showing a typical embodiment of the double-faced release sheet according to the present invention.

The first aspect of the present ivention is a release sheet having a release layer formed on at least one side of a support sheet, with an undercoat being disposed between the release layer and the support sheet, said undercoat being formed of a mixture of a soap-free type acrylic resin emulsion and oxidized starch.

Examples of the support sheet in the release sheet according to the present invention include a paper base, nonwoven fabrics, polymeric films and metal foils. These may be used either alone or in the form of a lamination thereof.

Suitable paper bases are made of kraft paper, fine paper and white board having basis weights of 30–300 g/m$^2$ and thicknesses of 30–350 μm.

Suitable nonwoven fabrics have basis weights of 10–150 g/m$^2$ and thicknesses of 30–400 μm and are produced by the dry method, wet method or direct method.

Suitable polymeric films have thicknesses in the range of 3 to 150 μm and illustrative examples include films of polyolefins such as polyethylene, polypropylene, polybutene, polymethylpentene and methylpentene copolymer; polyethylene terephthalate films, polyvinyl chloride films, polyvinylidene chloride films, fluorine resin films, and polyhexamethylene adipamide films.

Illustrative metal foils are copper foil, aluminum foil and tin foil having thicknesses in the range of 3–100 μm.

The soap-free type acrylic resin emulsion used in the present invention is defined as an acrylic resin emulsion which is devoid of any surfactant which would act as an emulsifier, or which contains not more than 2 parts by weight of such surfactant in 100 parts by weight of the solids content of the acrylic resin.

Soapless acrylic resin emulsions are classified as (1) an acrylic resin emulsified by a protective colloid, (2) an acrylic resin emulsified by a crosslinkable emulsifier, and (3) an aqueous dispersion of an acrylic resin copolymerized with a water-soluble polymer forming monomer. According to the studies conducted by the present inventors, (1) has poor adhesion to the release agent and exhibits low water resistance; (2) does not have sufficient solvent resistance to withstand the application of a solvent type release agent. On the other hand, (3) is free from the defects of (1) and (2) and may be used in the present invention. However, the soap-free type acrylic resin emulsion preferred for use in the present invetnion contains not more than 2 parts by weight, preferably not more than 1 part by weight, of a nonionic or anionic surfactant for 100 parts by weight of the solids in the acrylic resin. Such a soap-free acrylic resin emulsion may be prepared by polymerizing a system containing not more than 2 parts by weight of a surfactant for 100 parts by weight of the solids in the acrylic resin.

The conventional "soap-in" type acrylic resin emulsion prepared by using a fairly large amount of an emulsifier (i.e. at least about 3 parts by weight for 100 parts by weight of the solids in the resin) does not have good adhesion to release agent or coat-substrate adhesion due to the adverse effects of the emulsion.

The preferred soap-free acrylic resin emulsion suitable for use in the present invention is shown in Japanese Patent Public Disclosure No. 88392/1979.

The acrylic resin emulsion used in the present invention may be prepared by a known method of emulsion polymerization, for example, the method described in Japanese Patent Public Disclosure No. 88392/1979. The monomeric components of the acrylic resin are the combinations of acrylic acid esters or methacrylic acid esters and copolymerizable vinyl monomers. Illustrative acrylic acid esters are methyl acrylate, ethyl acrylate, n-butyl acrylate and 2-ethylhexyl acrylate; illustrative methacrylic acid esters include methyl methacrylate, ethyl methacrylate, n-butyl methacrylate and glycidyl methacrylate; illustrative copolymerizable vinyl monomers include unsaturated carboxylic acids such as acrylic acid, methacrylic acid and itaconic acid, as well as acrylamide, methacrylamide, acrylonitrile and styrene. One preferred monomeric combination is a major proportion of an acrylic acid ester combined with minor amounts of an unsaturated carboxylic acid and acrylonitrile.

The oxidized starch used in the present invention is a common coating binder; it is prepared by modifying starch with an oxidizer such as sodium hypochlorite. Modification with an oxidizer has two advantages: one is to provide improved stability for the starch and the other is to reduce the degree of starch polymerization by hydrolysis with the oxidizer. The oxidezed starch has an improved flowability in solution.

The melamine-formaldehyde resin used in the present invention is an addition product of melamine with formaldehyde. This resin causes the soap-free type acrylic resin and oxidized starch to enter into intermolecular and intramolecular crosslinking, thereby providing improved adhesion to the substrate, and high resistance to heat and water.

The soap-free type acrylic resin emulsion used in the present invention fulfills several functions: first, it imparts a film-forming property; secondly, it provides a good adhesion between the support sheet and release agent; thirdly, it provides a coat with sufficient solvent resistance, as well as a substrate which experiences minimum shrinkage upon application of heat in various steps of the process. The oxidized starch imparts heat resistance whereas the melamine-formaldehyde resin provides heat resistance for the soap-free type acrylic resin and good adhesion to the substrate, and water resistance for the oxidized starch.

A formulation that can be used in the present invention consists of 100 parts by weight (on a dry basis) of the soap-free type acrylic resin emulsion and 3–200 parts by weight (on a dry basis), preferably 5–50 parts by weight (on a dry basis) of the oxidized starch. The melamine-formaldehyde resin is used in an amount of 0.5–30 parts by weight (on a dry basis), preferably 1–15 parts by weight (on a dry basis). Insofar as it does not prejudice the purposes of the present invention, any auxiliary agent such as a viscosity control agent, a wetting agent or a film-forming additive may be used for the purpose of improving applicability on the support sheet and other properties of a mixture of the soap-free type acrylic resin emulsion and oxidized starch, or a cross-linking reaction product thereof with melamine-formaldehyde resin.

A conventional method may be used to form an undercoated layer on the support sheet from a mixture of soap-free type acrylic resin emulsion and oxidized starch or a cross-linking reaction product thereof with melamine-formaldehyde resin; a coating solution is prepared and applied to the support sheet with a roller coater or any other suitable device, and the web is dried and cured.

The present invention also relates to a double-faced release sheet having a coating of release agent formed on both surfaces of a support sheet composed of a cellulosic base sheet and a metal foil. An undercoated layer for the release layer formed on the cellulosic base sheet is made of a layer that principally consists of the soap-free type acrylic resin emulsion whereas an undercoated layer formed on the metal foil side is made of a layer that principally consists of a cross-linking reaction produce of thermosetting resins.

The support sheet for this double-faced release paper is composed of a lamination of a cellulosic base sheet and a metal foil. The cellulosic base sheet is generally made of kraft paper, neutral sized paper, fine paper and white board having a basis weight of 30–300 g/m² and a thickness of 30–350 μm. Neutral sized paper is preferred because of its high heat resistance. The metal foil is generally a copper foil, aluminum foil or tin foil having a thickness of 3–100 μm.

An undercoated layer formed on the cellulosic base side is made of a layer principally composed of the soap-free type acrylic resin emulsion, or the mixture of such emulsion and oxidized starch, or of a cross-linking reaction product of such mixture with the melamine-formaldehyde resin. A coating solution of the soap-free type acrylic resin emulsion, or its mixture with oxidized starch, or of a cross-linking reaction product of such mixture with melamine-formaldehyde resin is applied to the cellulosic base on the support sheet by a conventional technique using, for example, a roll coater, and the web is dried and cured in preparation for the application of a release layer.

Details of the soap-free type acrylic resin emulsion, its mixture with oxidized starch, as well as the cross-linking reaction product of such mixture with melamine-formaldehyde resin have already been given in the foregoing pages.

A formulation that can be used in the present invention consists of 100 parts by weight (on a dry basis) of the soap-free type acrylic resin emulsion and 3 to 200 parts by weight (on a dry basis), preferably 5 to 50 parts by weight (on a dry basis), of oxidezed starch. The melamine-formaldehyde resin is used in an amount of 0.5 to 30 parts by weight (on a dry basis), preferably 1 to 15 parts by weight (on a dry basis).

Insofars it does not prejudice the purposes of the present invention, any auxiliary additive such as a viscosity control agent, a wetting agent or a film-forming additive may be used for the purpose of improving the applicability on the cellulosic base and other properties of the mixture of soap-free type acrylic resin emulsion and oxidized starch or of a cross-linking reaction product of such mixture with the melamine-formaldehyde resin.

As a consequence of such treatment, the surface of the cellulosic base is provided with a good barrier against the coating solution of release agent, good adhesion to the release agent, as well as high heat resistance and good dimensional stability against heat.

Examples of the cross-linking reaction product of thermosetting resins suitable for use in the undercoated layer on the metal foil side of the support sheet include the cross-linking reaction product of a polyester resin and alkylated melamine and that of epoxide and alkylated melamine or polyvinyl phenolic resin.

The polyester resin used in the present invention is obtained by polycondensation of a polyhydric alcohol, polybasic acid and a modifier. The alkylated melamine used in the present invention is prepared by alkylating the methylol group in methylol melamine. Examples of the polyhydric alcohol that may be used include divalent alcohols such as ethylene glycol, diethylene glycol, propolyene glycol and trimethylene glycol; trivalent alcohols such as glycerine and trimethylpropane; as well as diglycerine, triglycerine and pentaerythritol. Illustrative polybasic acids include saturated polybasic acids such as phthalic anhydride, terephthalic acid, succinic acid and adipic acid; unsaturated polybasic acids such as maleic acid, maleic anhydride, fumaric acid and itaconic acid; as well as trimellitic anhydride, rosin modified maleic anhydride and pyromellitic anhydride. Illustrative modifiers are fatty oils such as tung oil, linseed oil, soybean oil, rapessed oil, coconut oil and olive oil; higher fatty acids such as stearic acid, oleic acid, linoleic acid and linolenic acid; natural resins such as rosin and shellac; and synthetic resins such as phenolic resins, urea resins and melamine resins.

The epoxide used in the present invention is of the glycidyl type and includes bisphenolic, novolak, alkylphenolic, resorcinol and polyglycolic resins having molecular weights in the range of 300 to 3,000. Bisphenolic resins with molecular weights of 320 to 900 are preferred.

Examples of the alkyl group in the alkylated melamine which enters into cross-linking reaction with these resins include methyl, ethyl, propyl and butyl groups.

The polyvinyl phenolic resin used in the present invention is a polymer type phenolic resin having a linear structure which is also known as a hydroxystyrene polymer. This resin is obtained from a hydroxystyrene homopolymer having at least 65 mol % of a hydroxystyrene unit of the formula:

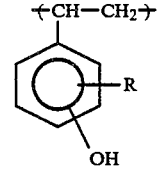

(wherein R is hydrogen or a halogen atom). Examples of such homopolymer are polyhydroxystyrene, polyhydroxychlorostyrene and polyhydroxybromostyrene. The resin may also be obtained from a polyhydroxystyrene copolymer having at least 65 mol % of said polymerization unit. The homopolymers or copolymer shown above have average molecular weights in the range of 1,000–20,000, preferably 3,000–8,000, with a hydroxyl group content of 50–500, preferably 100–250, equivalent amounts.

The hydroxystyrene unit may be copolymerized with at least one other polymerization unit such as styrene, α-methylstyrene, chloromethylstyrene, vinyl ether, vinyl ketone, acrolein, acrylonitrile, acrylic acid, acrylic acid ester, methacrylic acid ester, acrylamide, N,N-dimethylacrylamide, N-morphoylacrylamide, diene compound, divinylbenzene, isoprene, butadiene, dichloropentadiene or maleic anhydride.

The formation of an undercoated layer principally made of a cross-linking reaction product of thermosetting resins starts with the preparation of a coating solution capable of entering into the necessary cross-linking reaction; this coating solution is then applied to the metal foil on the support sheet and the web is subsequently dried and cured to form a coat having good adhesion to the release layer and high heat resistance.

Preferred combinations of the components of the coating solution are as follows: (1) a polyester resin that is prepared by polycondensation from a trivalent alcohol, a saturated polybasic acid and a higher aliphatic acid and which is combined with butylated melamine in proportions of 80:20–20:80, preferably 60:40–40:60; (2) bisphenolic epoxide having a molecular weight of 300–3,000 as combined with a polyglycolic epoxide and butylated melamine; (3) a bisphenolic epoxide combined with poly-p-vinylphenol, the proportions of the components being such that an epoxide having one epoxy equivalent is combined with poly-p-vinylphenol having a hydroxyl group of 0.1–10, preferably 0.5–5, equivalent amounts.

In the absence of a catalyst, curing at 200° C. or above is necessary for the formation of an undercoated layer from the cross-linking reaction product of thermosetting resins. A catalyst must be added in order to effect rapid curing at a temperature of 150° C. or below. If the cross-linking reaction product is that of a polyester resin and alkylated melamine, p-toluenesulfonic acid is usable as a catalyst. The p-toluenesulfonic acid must be added in an amount of 1–20 parts, preferably 4–10 parts, on a dry basis for 100 parts of the solids in the cross-linking reaction product of polyester resin and alkylated melamine. If the cross-linking reaction product is that of an epoxide and polyvinylphenolic resin, an inorganic base such as potassium hydroxide or an organic base such as amine may be used as the catalyst. Such catalyst must be added in an amount of 1–20 parts on a dry basis, preferably 3–10 parts, for 100 parts of the solids in the epoxide.

Insofar as it does not prejudice the purposes of the present invention, any auxiliary additive such as a diluting solvent or curing accelerator may be added for the purpose of improving the applicability to the support sheet and other properties of the cross-linking reaction product of thermosetting resins.

A conventional method may also be used to form an undercoated layer on the support sheet form the cross-linking reaction product of thermosetting resins; a coating solution containing, for example, a mixture of the polyester resin or epoxide and alkylated melamine or polyvinyl phenolic resin is prepared and applied to the support sheet with a roll coater or any other suitable device, and the web is subsequently dried and cured.

The release agent used in the present invention is not limited to any particular type, and known release agents such as silicone resins and non-silicone resins such as long-chain alkyl acrylate polymer resins may be used. The formation of a release coat may be effected by any conventional method.

EXAMPLES

The release sheet according to the present invention exhibits a good barrier against the coating solution for the formation of a release layer, has strong adhesion to the release agent and provides high heat resistance and dimensional stability against heat. These advantages will become apparent by reading the following examples, to which the scope of the present invention are by no means limited.

The "barrier against the coating solution of release agent", "adhesion to substrate", "moisture resistance" and "heat resistance" shown in Tables 1 to 5 were determined for samples having no release layer, whereas the "adhesion to release agent" and "dimentional stability against heat" were determined for samples having a release layer. The respective parameters were determined by the following methods.

(1) Barrier against coating solution of release agent

A 5 wt % coating solution of silicone release agent as diluted with toluene was applied to the surface of a paper base and the penetration of the coating solution was checked visually. The indices of rating were as follows:

O: no penetration of the coating solution
Δ: slight penetration of the coating solution
x: extensive penetration of the coating solution (2) Adhesion to substrate Cellophane adhesive tape was pressed onto an undercoated layer, and the tape was subsequently peeled off to examine visually the state of the undercoated layer. The indices of rating were as follows:

O: no change in the undercoated layer
Δ: some adhesion to the tape
x: extensive adhesion to the tape (3) Moisture resistance A sample was left to stand for 24 hours in an atmosphere of 20° C. and 90% r.h. Cellophane adhesive tape was pressed onto an undercoated layer on the sample, and the tape was subsequently peeled off to examine visually the state of the undercoated layer. The indices of rating were as follows:

O: no change in the undercoated layer
Δ: some adhesion to the tape
x: extensive adhesion to the tape (4) Heat resistance A sample with an undercoated layer was left to stand for 1 minute in a hot-air dryer at 150° C. and thereafter, the state of the undercoated layer was examined visually. The indices of rating were as follows:

O: no change
Δ: slightly melted or discolored
x: melted, discolored or otherwise deteriorated (5) Adhesion to release agent A sample with a silicone release layer as prepared in (1) was dried and cured. Toluene was applied to the release layer and visual checking was made as to whether any part of the release coat came off. The indices of rating were as follows:

O: no change
Δ: some part came off
x: extensive part came off (6) Dimensional stability against heat A sample was heated to 150° C. and then cooled to 20° C. The resulting shrinkage in the sample was measured.

Examples 1 to 4

Four support sheets were prepared; they were respectively composed of (1) fine paper (basis weight: 64 g/m$^2$, thickness: 80 μm), (2) rayon-based nonwoven fabric (basis weight: 40 g/m$^2$, thickness: 113 μm), (3) polypropylene film (thickness: 50 μm), and (4) aluminum foil (thickness: 50 μm). A 25 wt % aqueous dispersion of a soap-free type acrylic resin emulsion ("BONRON S-482" of Mitsui Toatsu Chemicals, Inc.) and 30 parts by weight (on solids basis) of oxidized starch ("Ace A" of Oji Cornstarch Co., Ltd.) was applied to each support by a roll coater to provide a coating thickness of 5 g/m² (on solids basis), and the web was subsequently dried. Twenty comparative samples (Nos. 1 to 20) were prepared by applying to the support sheets (1) soap-free type acrylic resin emulsion ("BONRON S-482" of Mitsui Toatsu Chemicals, Inc.), (2) oxidized starch ("Ace A" of Oji Cornstarch Co., Ltd.), (3) a pigment coating solution (clay/SBR latex at a weight ratio of 100/20, conc. 48 wt %), (4) polyvinyl alcohol, or (5) polyethylene.

The respective samples were checked for their ability to provide a barrier against the coating solution of release agent, adhesion to release agent, heat resistance and dimensional stability against heat. The results are shown in Table 1.

TABLE 1

| Run No. | | barrier against coating sol. of release agent | adhesion to release agent | heat resistance | dimensional stability against heat (shrinkage ratio) |
|---|---|---|---|---|---|
| Ex. 1 | | O | O | O | 0.17% |
| Comp. Ex. | 1 | O | O | Δ | 0.14% |
| | 2 | Δ | Δ | O | 0.20% |
| | 3 | O | X | O | 0.17% |
| | 4 | O | O | O | 0.42% |
| | 5 | O | O | X | * |
| Ex. 2 | | O | O | O | 0.15% |
| Comp. Ex. | 6 | O | O | Δ | 0.19% |
| | 7 | Δ | Δ | O | 0.24% |
| | 8 | O | X | O | 0.20% |
| | 9 | O | O | O | 0.54% |
| | 10 | O | O | X | * |
| Ex. 3 | | O | O | Δ | 1.78% |
| Comp. Ex. | 11 | O | O | Δ | 1.73% |
| | 12 | Δ | Δ | Δ | 1.95% |
| | 13 | O | X | Δ | 1.49% |
| | 14 | O | O | Δ | 2.24% |
| | 15 | O | O | X | * |
| Ex. 4 | | O | O | O | 0.33% |
| Comp. Ex. | 16 | O | O | Δ | 0.39% |
| | 17 | Δ | Δ | O | 0.56% |
| | 18 | O | X | O | 0.30% |
| | 19 | O | O | O | 0.65% |
| | 20 | O | O | X | * |

*Shrinkage ratio could not be measured since polyethylene was melted.

Examples 5 to 8

Four support sheets were prepared; they were respectively composed of (5) fine paper (basis weight: 64 g/m², thickness: 80 μm), (6) rayon-based nonwoven fabric (basis weight: 40 g/m², thickness: 113 μm), (7) polypropylene film (thickness: 50 μm) and (8) aluminum foil (thickness: 50 μm). To each support, a 25 wt % aqueous dispersion of 100 parts by weight (solids basis) of soap-free type acrylic resin emulsion ("BONRON S-482" of Mitsui Toatsu Chemicals, Inc.), 30 parts by weight (solids basis) of oxidized starch ("Ace A" of Oji Cornstarch Co., Ltd.) and 3 parts by weight (solids basis) of melamine-formaldehyde resin ("U-RAMIN P-6300" of Mitsui Toatsu Chemicals, Inc.) was applied by a roller coater to provide a coating thickness of 5 g/m² (solids basis) and the web was dried. Twenty comparative samples (Nos. 21 to 40) were prepared by coating each support with (1) soap-free type acrylic resin emulsion ("BONRON S-482" of Mitsui Toatsu Chemicals, Inc.), (2) oxidized starch ("Ace A" of Oji Cornstarch Co., Ltd.), (3) pigment coating solution (clay/SBR latex at a weight ratio of 100/20, conc. 48 wt %), (4) polyvinyl alcohol or (5) polyethylene.

The respective samples were checked for their ability to provide a barrier against the coating solution of release agent, adhesion to release agent, heat resistance and dimensional stability against heat. The results are shown in Table 2.

TABLE 2

| Run No. | | barrier against coating sol. of release agent | adhesion to release agent | heat resistance | dimensional stability against heat (shrinkage ratio) |
|---|---|---|---|---|---|
| Ex. 5 | | O | O | O | 0.15% |
| Comp. Ex. | 21 | O | O | Δ | 0.14% |
| | 22 | Δ | Δ | O | 0.20% |
| | 23 | O | X | O | 0.17% |
| | 24 | O | O | O | 0.42% |
| | 25 | O | O | X | * |
| Ex. 6 | | O | O | O | 0.18% |
| Comp. Ex. | 26 | O | O | Δ | 0.19% |
| | 27 | Δ | Δ | O | 0.24% |
| | 28 | O | X | O | 0.20% |
| | 29 | O | O | O | 0.54% |
| | 30 | O | O | X | * |
| Ex. 7 | | O | O | O | 1.75% |
| Comp. Ex. | 31 | O | O | Δ | 1.73% |
| | 32 | Δ | Δ | Δ | 1.95% |
| | 33 | O | X | Δ | 1.49% |
| | 34 | O | O | Δ | 2.24% |
| | 35 | O | O | X | * |
| Ex. 8 | | O | O | O | 0.35% |
| Comp. Ex. | 36 | O | O | Δ | 0.39% |
| | 37 | Δ | Δ | O | 0.56% |
| | 38 | O | X | O | 0.30% |
| | 39 | O | O | O | 0.65% |
| | 40 | O | O | X | * |

*Shrinkage ratio could not be measured since polyethylene was melted.

As will be clear from the above data, release sheet that satisfy all the requirements for providing a good barrier against the coating solution of release agent, good adhesion to release agent, high heat resistance and good dimensional stability against heat can be obtained according to the present invention by using a soap-free type acrylic resin emulsion in combination with oxidized starch, or by incorporating a melamine-formaldehyde resin in addition to the two components. Therefore, the release sheet of the present invention is particularly suitable for use with adhesive products such as adhesive tape or labels, or for use during the manufacturing of synthetic vinyl chloride leathers or carbon fiber prepregs.

Examples are hereunder given for the double-faced release sheet of the present invention.

Example 9

A support sheet composed of a lamination of an aluminum foil (thickness: 10 μm) and a paper base (fine paper with a basis weight of 64 g/m²) was provided. To the aluminum foil side of the support, a coating solution containing a 50/50 mixture of polyester resin and butylated melamine ("HARIFUTAL SB-7123" and "BANCEMIN SM-975" of HARIMA CHEMICALS, INC.) was applied with a roll coater to give a coating thickness of 1 g/m² (on solids basis), and the web was subsequently dried and cured at 150° C. for 30 seconds. To the paper base side of the support, a 25 wt % aqueous dispersion of 100 parts by weight (solids basis) of soap-free type acrylic resin emulsion ("BONRON S-482" of Mitsui Toatsu Chemicals, Inc.) and 30 parts by weight (solids basis) of oxidized starch ("Ace A" of Oji cornstarch Co., Ltd.) was applied to provide a coating thickness of 5 g/m² (on solids basis) with a roll coater, and the web was subsequently dried.

A 5 wt % coating solution of silicone release agent diluted with toluene was applied to each undercoated layer, and the web was dried and cured at 130° C. for 30 seconds to provide a double-faced release sheet.

The resulting sample of double-faced release sheet exhibited a strong barrier against the coating solution of release agent, had good adhesion to the substrate, showed high resistance to moisture and heat, and provided good adhesion to release agent and high dimensional stability against heat, as will be apparent from Table 3.

Example 10

A double-faced release sheet was prepared as in Example 9 except that the undercoated layer on the paper base side of the support was formed by applying a 25 wt % aqueous dispersion of 100 parts by weight (solids basis) of soap-free type acrylic resin emulsion ("BONRON S-482" of Mitsui Toatsu Chemicals, Inc.), 30 parts by weight (solids basis) of oxidized starch ("Ace A" of Oji Cornstarch Co., Ltd.) and 3 parts by weight (solids basis) of melamine-formaldehyde resin ("U-RAMIN P-6300" of Mitsui Toatsu Chemicals, Inc.) with a roll coater to provide a coating thickness of 5 g/m² (on solids basis).

The resulting sample of double-faced release sheet exhibited a strong barrier against the coating solution of release agent, had good adhesion to the substrate, showed high resistance to moisture and heat, and provided good adhesion to release agent and high dimensional stability against heat, as will be apparent from Table 3.

Comparative Examples 41 to 43

Comparative samples Nos. 41 to 43 were prepared as in Example 9 except that the undercoats on the paper base side were respectively made from (1) a 48 wt % pigment coating solution of clay/SBR latex (weight ratio: 100/20) mixture, (2) polyvinyl alcohol, and (3) polyethylene. The results of tests conducted with these comparative samples are shown in Table 3. Obviously, the results of these comparative samples were inferior to those obtained with the double-faced release sheet samples prepared in Examples 9 and 10.

TABLE 3

| Run No. | barrier against coating sol. of release agent | adhesion to substrate | moisture resistance | heat resistance | adhesion to release agent | dimensional stability against heat (shrinkage ratio) |
|---|---|---|---|---|---|---|
| Ex. 9 | — | O | O | O | O | 0.09% |
|  | O | O | O | O | O |  |
| Ex. 10 | — | O | O | O | O | 0.06% |
|  | O | O | O | O | O |  |
| Comp. Ex. 41 | — | Δ | Δ | O | X | 0.26% |
|  | O | O | O | O | X |  |
| Comp. Ex. 42 | — | X | X | O | O | 0.39% |
|  | O | Δ | X | O | O |  |
| Comp. Ex. 43 | — | Δ | O | X | O | impossible measurement (polyethylene melted) |
|  | O | O | O | X | O |  |

As is clear from Table 3, the double-faced release sheet of the present invention satisfies all the requirements for providing a strong barrier against the coating solution of release agent, good adhesion to the release agent, as well as high heat resistance and dimensional stability against heat. Therefore, the double-faced release sheet of the present invention is particularly suitable for use with adhesive products such as adhesive tape and labels, as well as for use during the production of synthetic vinyl chloride leathers or carbon fiber prepregs.

Example 11

A support sheet made of a lamination of an aluminum foil (thickness: 10 μm) and a paper sheet (fine paper with a basis weight of 64 g/m²) was prepared. To the aluminum foil side of the support, a coating solution containing an epoxide/butylated melamine mixture ("SF-410" of Dainippon Ink & Chemicals Inc.) was applied with a roll coater to provide a coating thickness of 1 g/m² (solids basis) and the web was dried and cured at 150° C. for 30 seconds.

To the paper base side of the support, a 25 wt % aqueous dispersion of 100 parts by weight (solids basis) of soap-free acrylic resin emulsion ("BONRON S-482" of Mitsui Toatsu Chemicals Inc.) and 30 parts by weight (solids basis) of oxidized starch ("Ace A" of Oji Cornstarch Co., Ltd.) was applied by a roll coater to provide a coating weight of 5 g/m² (solids content), and the web was subsequently dried.

To each of the resulting undercoats was applied, a 5 wt % coating solution of silicone release agent diluted with toluene, and the web was dried and cured at 130° C. for 30 seconds to provide a double-faced release sheet.

Example 12

A double-faced release sheet was prepared as in Example 11 except that the undercoated layer on the paper base side of the support was formed by applying a 25 wt % aqueous dispersion of 100 parts by weight (solids basis) of soap-free type acrylic resin emulsion ("BONRON S-482" of Mitsui Toatsu Chemicals, Inc.), 30 parts by weight (solids basis) of oxidized starch ('Ace A' of Oji Cornstarch Co., Ltd.) and 3 parts by weight (solids basis) of melamine-formaldehyde resin ("U-RAMIN P-6300" of Mitsui Toatsu Chemicals, Inc.) with a roll coater to provide a coating thickness of 5 g/m² (solids content). The double-faced release sheet samples prepared in Examples 11 and 12 exhibited a good barrier against the coating solution of release agent, had good adhesion to the substrate, showed high resistance to moisture and heat, and provided good adhesion to the release agent and high dimensional stability against heat, as shown in Table 4.

Comparative Examples 44 to 46

Comparative sample Nos. 44 to 46 were prepared as in Example 11 except that the undercoated layers on the paper base side of the support were made of (1) a 48 wt % pigment coating solution containing a 100/20 mixture (weight ratio) of clay and SBR latex, (2) polyvinyl alcohol and (3) polyethylene. The properties of these comparative samples are shown in Table 4, from which one can see that their properties were inferior to those of the double-faced release sheet samples prepared in Examples 11 and 12.

TABLE 4

| Run No. | barrier against coating sol. of release agent | adhesion to substrate | moisture resistance | heat resistance | adhesion to release agent | dimensional stability against heat (shrinkage ratio) |
|---|---|---|---|---|---|---|
| Ex. 11 | — | O | O | O | O | 0.07% |
|  | O | O | O | O | O |  |
| Ex. 12 | — | O | O | O | O | 0.05% |
|  | O | O | O | O | O |  |
| Comp. Ex. 44 | — | Δ | Δ | O | X | 0.25% |
|  | O | O | O | O | X |  |
| Comp. Ex. 45 | — | X | X | O | O | 0.35% |
|  | O | Δ | X | O | O |  |
| Comp. Ex. 46 | — | Δ | O | X | O | impossible measurement (polyethylene melted) |
|  | O | O | O | X | O |  |

Example 13

A support sheet made of a lamination of an aluminum foil (thickness: 10 μm) and a paper sheet (fine paper with a basis weight of 64 g/m²) was prepared. To the aluminum foil side of the support, a coating solution containing a mixture of epoxide and poly-p-vinylphenol ("Araldite 6071" of Ciba Co. and "Resin M" of Maruzen Oil with a mixing ratio of one hydroxyl group per equivalent of epoxy group) was applied with a roll coater to provide a coating weight of 1 g/m² (solids basis), and the web was subsequently dried and cured at 150° C. for 30 seconds.

To the paper base side of the support, a 25 wt % aqueous dispersion containing 100 parts by weight (solids basis) of soap-free type acrylic resin emulsion ("BONRON S-482" of Mitsui Toatsu Chemicals, Inc.) and 30 parts by weight (solids basis) of oxidized starch ("Ace A" of Oji Cornstarch Co., Ltd.) was applied with a roll coater to provide a coating weight of 5 g/m² (solids basis), and the web was subsequently dried.

To each of the undercoats thus formed, a 5 wt % coating solution of silicone release agent diluted with toluene was applied, and the web was dried and cured at 130° C. for 30 seconds to provide a double-faced release sheet.

The resulting double-faced release sheet exhibited excellent properties in terms of forming barrier against the coating solution of release agent, adhesion to the substrate, resistance to moisture and heat, adhesion to the release agent and dimensional stability against heat, as shown in Table 5.

Example 14

A double-faced release sheet was prepared as in Example 13 except that the undercoated layer on the paper base side of the support was made by applying a 25 wt % aqueous dispersion containing 100 parts by weight (solids basis) of soap-free type acrylic resin emulsion ("BONRON S-482" of Mitsui Toatsu Chemicals, Inc.), 30 parts by weight (solids basis) of oxidized starch ("Ace A" of Oji Cornstarch Co., Ltd.) and 3 parts by weight (solids basis) of melamine-formaldehyde resin ("U-RAMIN P-6300" of Mitsui Toats Chemicals, Inc.) with a roller coater to provide a coating weight of 5 g/m² (solids basis), followed by drying the web.

The double-faced release sheet thus prepared showed excellent properties in therms of providing a barrier against the coating solution of release agent, adhesion to the substrate, resistance to moisture and heat, adhesion to the release agent and dimensional stability against heat, as illustrated in Table 5.

Comparative Examples 47 to 49

Comparative sample Nos. 47 to 49 were prepared as in Example 13 except that the undercoats on the paper base side were respectively made of (1) a 48 wt % pigment coating solution containing a 100:20 (weight ratio) mixture of clay and SBR latex, (2) polyvinyl alcohol and (3) polyethylene. The properties of these comparative samples are shown in Table 5, from which one can see that their properties were inferior to those of the double-faced release sheets prepared in Examples 13 and 14.

TABLE 5

| Run No. | barrier against coating sol. of release agent | adhesion to substrate | moisture resistance | heat resistance | adhesion to release agent | dimensional stability against heat (shrinkage ratio) |
|---|---|---|---|---|---|---|
| Ex. 13 | — | O | O | O | O | 0.08% |
|  | O | O | O | O | O |  |
| Ex. 14 | — | O | O | O | O | 0.04% |
|  | O | O | O | O | O |  |
| Comp. Ex. 47 | — | Δ | Δ | O | X | 0.27% |
|  | O | O | O | O | X |  |
| Comp. Ex. 48 | — | X | X | O | O | 0.40% |
|  | O | Δ | X | O | O |  |
| Comp. Ex. 49 | — | Δ | O | X | O | impossible measurement (polyethylene melted) |
|  | O | O | O | X | O |  |

As is clear from Examples 9 to 14, the double-faced release sheet of the present invention satisfies all the requirements for providing a good barrier against the coating solution of release agent, good adhesion to the release agent, as well as high heat resistance and dimensional stability against heat. Therefore, the double-faced release sheet of the present invention is particularly suitable for use with adhesive products such as adhesive tape and labels, as well as for use during the production of synthetic vinyl chloride leathers or carbon fiber prepregs.

What is claimed is:

1. A release sheet comprising a support sheet having a release layer formed on at least one side thereof with an undercoated layer being disposed between said support sheet and the release layer, said undercoated layer being formed from a mixture of a soap-free type acrylic resin emulsion and oxidized starch.

2. A release sheet according to claim 1 wherein the material for the undercoated layer further contains a melamine-formaldehyde resin.

3. A release sheet according to claim 1 wherein said support sheet is made of a cellulosic sheet material.

4. A release sheet according to claim 3 wherein the cellulosic sheet material is paper.

5. A release sheet according to claim 1 wherein the support sheet is a polymeric film.

6. A release sheet according to claim 1 wherein the support sheet is a metal foil.

7. A release sheet according to claim 6 wherein the metal foil is an aluminum foil.

8. A release sheet according to claim 1 wherein the support sheet is a lamination of paper and an aluminum foil.

9. A double-faced release sheet having a coating of release agent formed on both surfaces of a support made of a lamination of a base sheet and a metal foil, said release sheet having an undercoated layer between each surface of the support and the release agent coating, the undercoated layer on the base sheet side being a layer principally made of a soap-free type acrylic resin emulsion whereas the undercoated layer on the metal foil side is a layer principally made of a cross-linking product of thermosetting resins.

10. A double-faced release paper according to claim 9 wherein the undercoated layer on the base sheet further contains oxidized starch.

11. A double-faced release sheet according to claim 9 wherein the material for the undercoated layer on the base sheet side further contains a melamine-formaldehyde resin.

12. A double-faced release sheet according to claim 9 wherein the cross-linking reaction product of thermosetting resins is a cross-linking reaction product of a polyester resin and alkylated melamine.

13. A double-faced release sheet according to claim 9 wherein the cross-linking reaction product of thermosetting resins is a cross-linking reaction product of epoxide and alkylated melamine.

14. A double-faced release sheet according to claim 9 wherein the cross-linking reaction product of thermosetting resin is a cross-linking reaction product of epoxide and a polyvinyl phenolic resin.

15. A double-faced release sheet according to claim 9 wherein said base sheet is made of a cellulosic sheet material.

16. A double-faced release sheet according to claim 9 wherein said base sheet is made of paper.

17. A double-faced release sheet according to claim 9 wherein said metal foil is an aluminum foil.

* * * * *